Patented Feb. 8, 1944

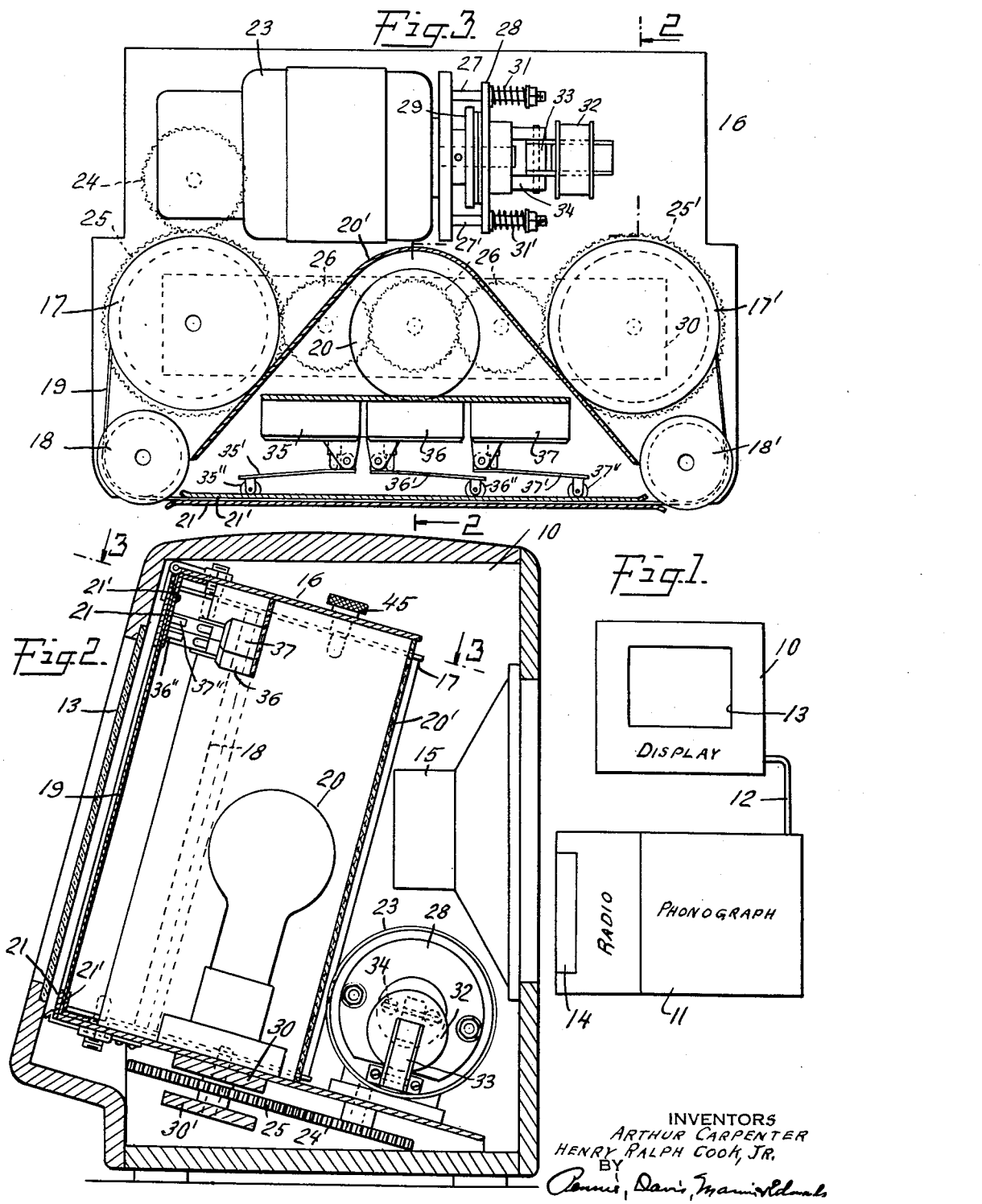

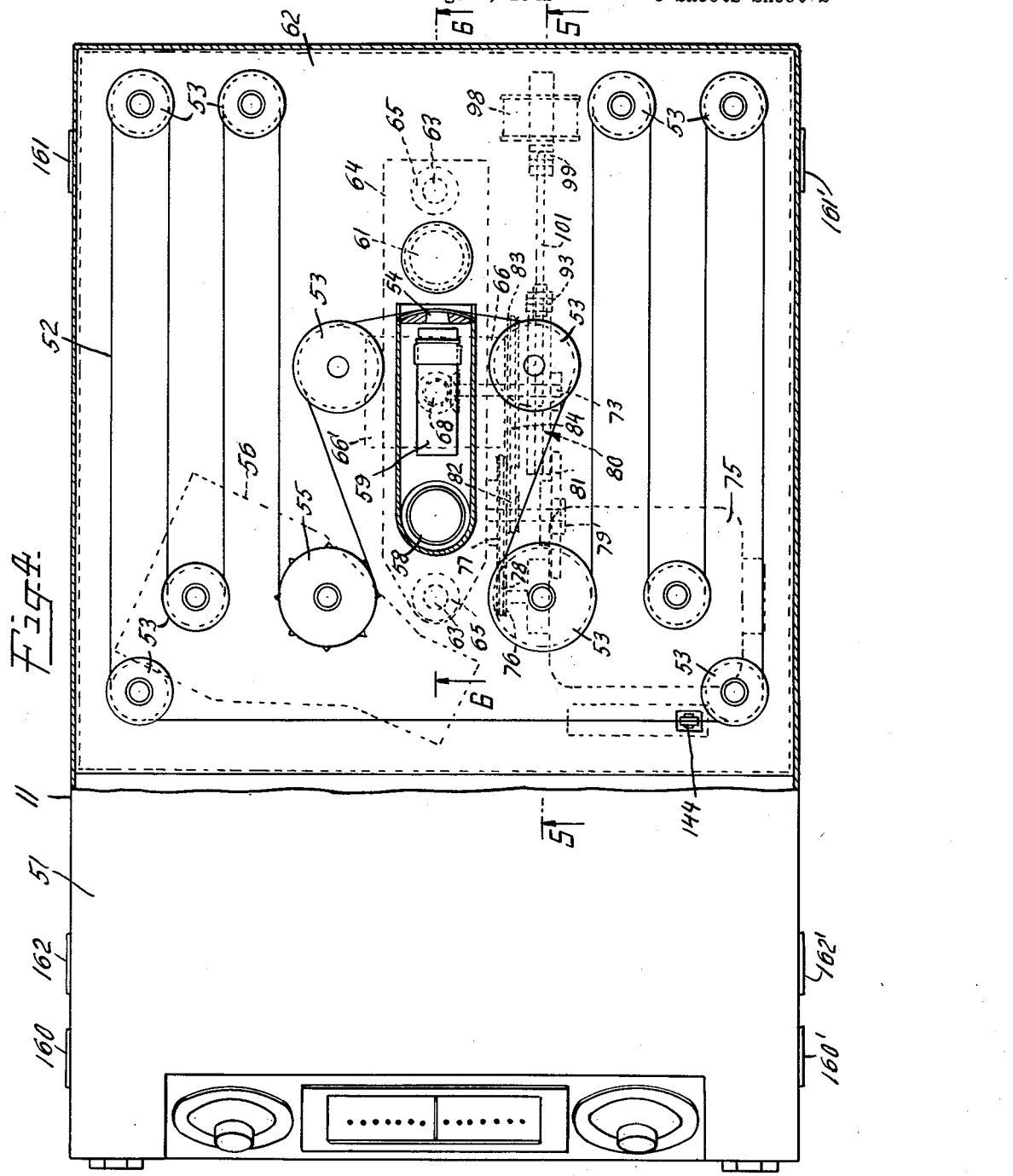

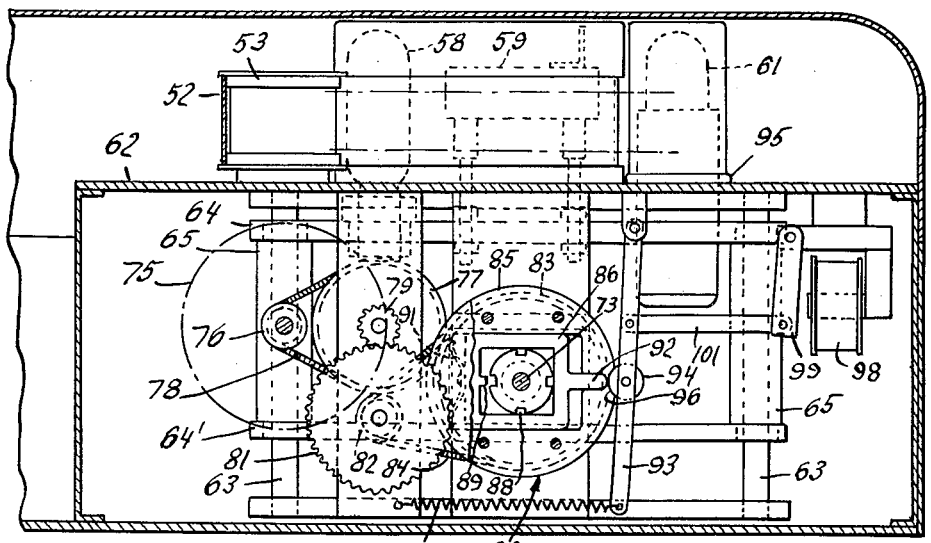
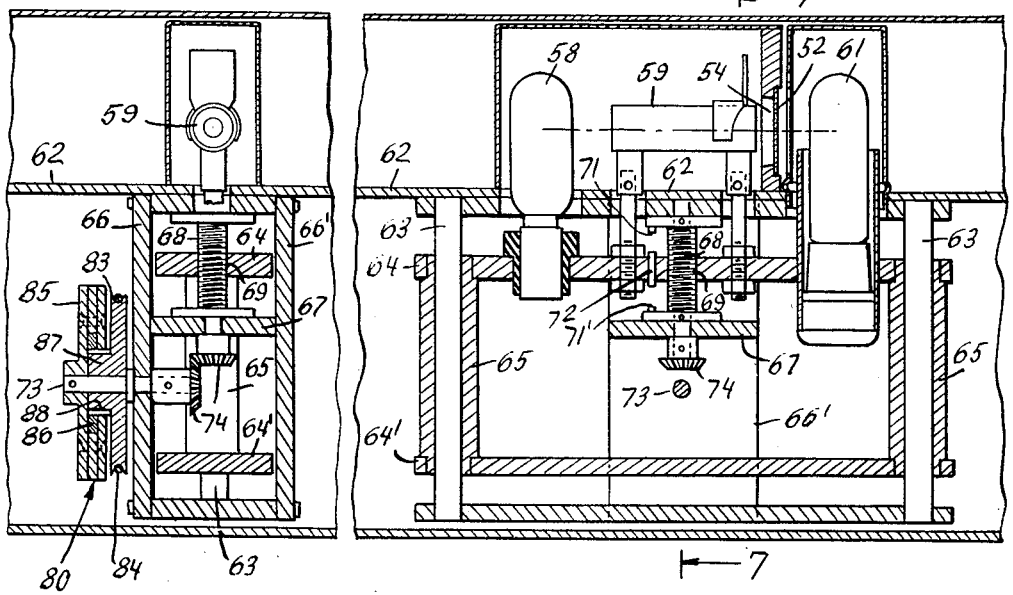

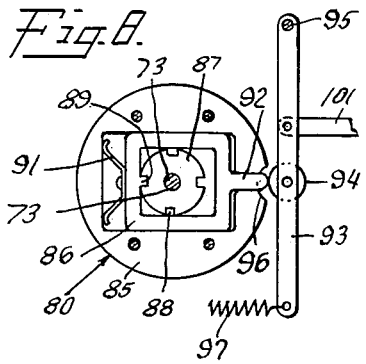
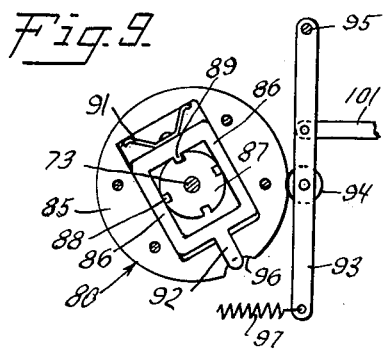
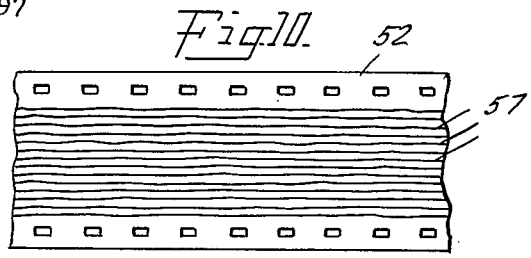
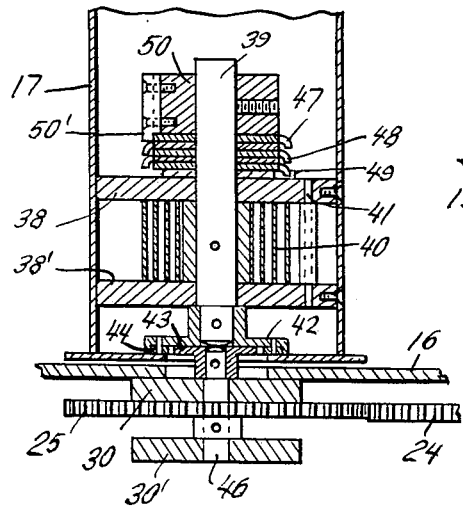
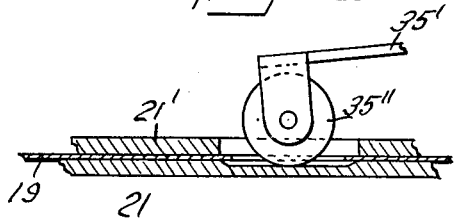

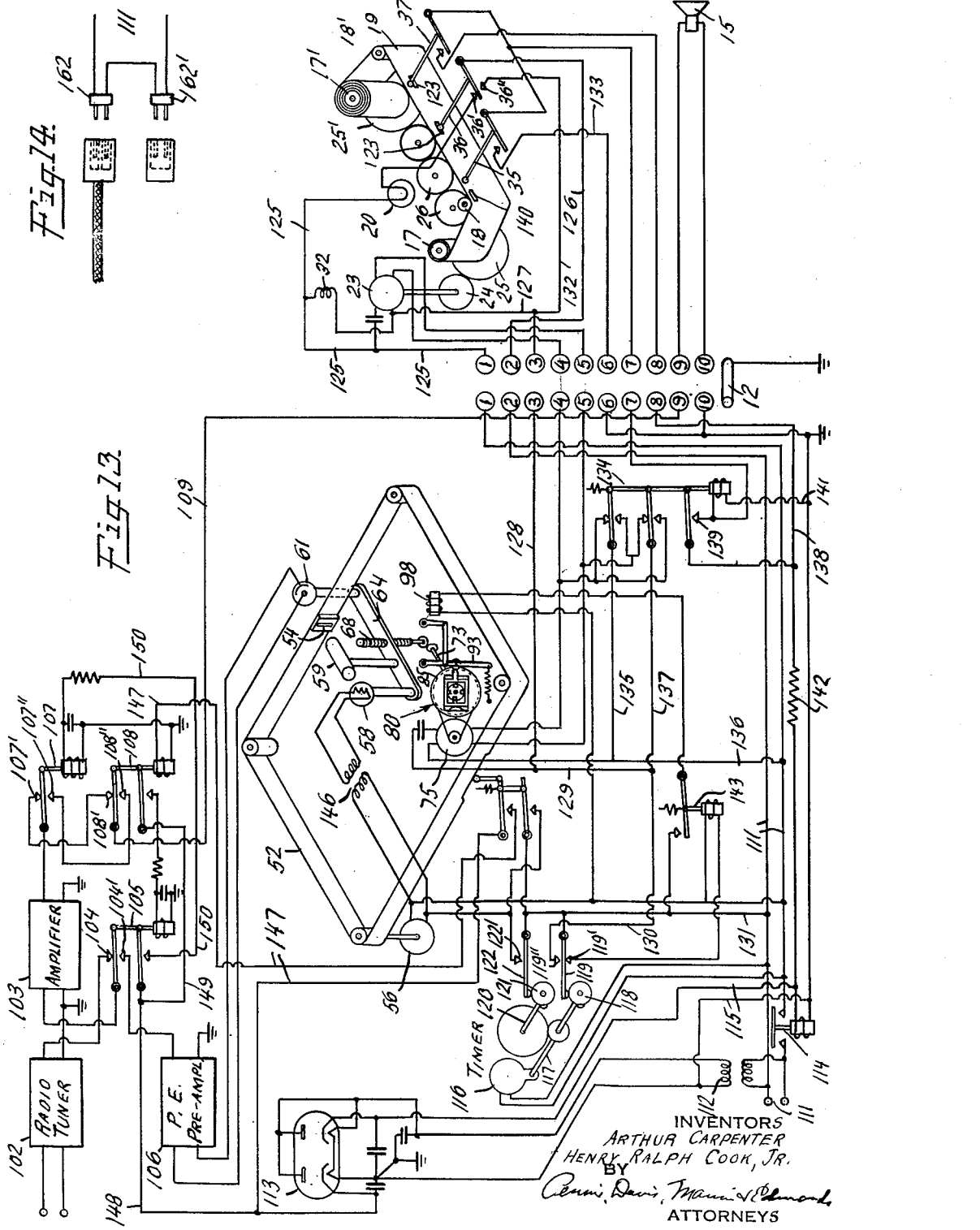

2,340,863

UNITED STATES PATENT OFFICE 2,340,863

DISPLAY APPARATUS

Arthur Carpenter, New York, N. Y., and Henry Ralph Cook, Jr., Westwood, N. J., assignors to Adolph O. Goodwin, New York, N. Y.

Application August 2, 1941, Serial No. 405,186

10 Claims. (Cl. 40—28)

This invention relates to display apparatus utilizing combined sight-and-sound presentations. The invention particularly is directed to the provision of such a combination which is reliable and will give satisfactory service for long periods without attention, and which has means for automatically resynchronizing sight-and-sound presentations in the event of temporary false operation.

Application Serial No. 353,082, filed August 17, 1940, discloses the general combination of a display apparatus, phonograph and radio in which the phonograph is so synchronized and timed with respect to the display apparatus that accompanying sales or advertising talks are reproduced at only selected non-consecutive appearances of corresponding displays. Within a complete cycle, however, the accompanying talk for each display is reproduced. During the intervals between reproductions of the advertising talks, a radio receiver is automatically rendered operable.

The present invention is directed to improvements on this previously disclosed system, and is designed to provide a more satisfactory phonograph unit, together with means for automatically resynchronizing the unit with the display apparatus.

In the application just mentioned the several advertising talks are recorded successively along the sound film and the film is moved the distance required to reproduce one talk while the corresponding display is being exhibited. When a number of displays are employed, for example fourteen, a consideralbe length of sound film is required to obtain a desired degree of fidelity. Hence, to economize space, the film is wound in overlapping relationship around suitable rollers. While this is quite feasible, in apparatus designed to run continuously for a considerable time without attendance, for example a month, difficulty may be encountered due to expansion and contraction of the film, etc. Therefore, in the apparatus of the present invention, the plurality of sales talks are recorded side by side on the sound record, and a pickup is moved relative to the sound record to register successively with the several sound tracks. Preferably the sound record is an endless band moved longitudinally relative to the pickup for reproduction of the advertising talks.

In operation, the displays are intermittently moved to exhibit the displays successively. Each intermittent movement is initiated by suitable timing means, but it is considered advantageous to have the movement interrupted by means responsive to the position of the display to be exhibited. In this manner the accurate framing of the display is assured. Similarly, the relative movement of the pickup and sound record laterally of the record is initiated by suitable timing means, preferably the one that controls the displays, but the registration of the pickup with the sound tracks successively is determined by stopping the registering movement in accordance with the position of the mechanism. Longitudinal movement of the record relative to pickup, to cause the phonograph to play, is initiated at selected intervals by phonograph timing means, and the stopping of movement is preferably controlled by the position of the record relative to pickup.

It will therefore be understood that although the movements of the displays and the pickup registering mechanism may be initiated by a single timer, or timers running in synchronism, the interruption of the movements are preferably independently controlled by the positions of the respective mechanisms. Due to this independent control and due to the fact that relays, switches, etc. are commonly employed to start and stop the respective movements, there is always a possibility that a relay or a switch may occasionally refuse to function, or function improperly, thus causing the displays to get out of synchronism with the corresponding sound tracks. The false operation may be only temporary, however, so that if synchronism is periodically restored, the apparatus may continue to function satisfactorily. Hence, in accordance with the present invention, means are provided for resynchronizing display and sound tracks at one, and preferably both, ends of travel of the pickup registering mechanism. Since it is contemplated that the phonograph will actually play only a few times, say twice, during the range of travel, only one or two wrong talks will be ordinarily reproduced before resynchronization.

The invention also provides a mechanism for registering the pickup successively with the sound tracks which insures accurate registration in a simple and effective manner. Other features of the invention will in part be pointed out, and in part be obvious, in the description hereinafter.

The invention will be more fully understood by reference to the following description of a preferred embodiment, in conjunction with the accompanying drawings. In the drawings:

Fig. 1 is a general view of the complete apparatus;

Fig. 2 is an elevation in section of the display unit, taken substantially along the line 2—2 of Fig. 3;

Fig. 3 is a sectional view of the display unit taken along the line 3—3 of Fig. 2;

Fig. 4 is a plan view of the radio-phonograph unit with the cover of the phonograph unit removed;

Fig. 5 is a vertical section of the phonograph unit taken along the line 5—5 of Fig. 4;

Fig. 6 is a vertical section taken along the line 6—6 of Fig. 4;

Fig. 7 is a section taken along the line 7—7 of Fig. 6;

Fig. 8 is a detail of the clutch of the pickup registering mechanism shown in engaged position;

Fig. 9 is a detail of the clutch in partly rotated position;

Fig. 10 is a fragment of the sound record;

Fig. 11 is a detail of one of the poster-belt drums;

Fig. 12 is a detail showing the lever of a microswitch in a slot of the poster belt;

Fig. 13 is a wiring diagram of the complete apparatus, parts being shown diagrammatically in perspective; and Fig. 14 is a circuit diagram of a duplicate power plug connection.

In Fig. 1 a display unit 10 is connected to a separate radio-phonograph unit 11 through a cable 12. Although all three units may be combined in one cabinet, if desired, it is advantageous to separate the unit as shown, so that the display unit may be placed in a favorable location for attracting the attention of the public, while the radio-phonograph unit may be placed conveniently for the store owner or other operator, and out of reach of the public. The display unit 10 has a window 13 through which the displays are exhibited successively. The radio has a panel 14 on which the usual tuning and control knobs are located.

Referring to Figs. 2 and 3, the cabinet 10 of the display unit houses a loud speaker 15 which is electrically connected through cable 12 (Fig. 1) to the radio-phonograph unit. Within cabinet 10 is mounted a frame 16 on which are rotatably mounted poster-belt drums 17, 17', and rollers 18, 18'. A poster-belt 19 is secured at its free ends to drums 17, 17', and passes over rollers 18, 18', and between guides 21, 21', positioned around the window 13. The outer guide 21 is advantageously hinged at 22 to facilitate loading and unloading poster-belts. A suitable lamp 20 and reflector 20' are positioned to illuminate the posters.

Drum 17 is driven by motor 23 through gears 24 and 25. Gear 25 is coupled through a train of idler gears 26 to gear 25'. The gears are mounted in the frame 30, 30'. Gears 25 and 25' are attached to drums 17 and 17' respectively, in a manner described in connection with Fig. 11, so that the drums are driven in synchronism and in the same direction. Motor 23 is of a reversible type, the type here specifically shown being a split phase A. C. motor.

In order to stop the motor quickly to prevent coasting, a magnetically operated brake is advantageously employed. This brake comprises a pair of shafts 27, 27' affixed to the housing of motor 23 and carrying a brake plate 28 slidably mounted thereon. A friction plate 29 is affixed to the shaft of the motor. Brake plate 28 is pressed against plate 29 by springs 31, 31', so that it is normally biased into braking engagement with the motor. The brake plate 28 may be withdrawn by energizing solenoid 32, which acts through lever arm 33 pinned to yoke 34 to pull back the plate 28.

In order to frame posters on poster belt 19 accurately in window 13, and to reverse the poster belt at the ends of travel thereof, microswitches 35, 36, 37 are employed. These switches have corresponding actuating lever arms 35', 36', 37', and rollers 35'', 36'', 37'', which bear against the poster belt. Suitable switch-actuating areas are provided on the poster belt to actuate these switches. While switch-actuating areas consisting of thickened areas of the poster belt may be employed, it is considered preferable to cut slots in the belt at the proper intervals so as to avoid humps when the poster belt is wound around the drums, thereby avoiding tearing of the belt. It is advantageous to cut away the outer guide 21 underneath the rollers of the switches, as shown in Fig. 12. Thus, when a roller passes through a slot it can move a distance somewhat greater than the thickness of the poster belt, the additional length of travel insuring reliability in actuating the microswitches.

Microswitches 35 and 37 are connected in a manner described hereinafter so as to reverse the poster belt at opposite ends of its travel. A slot of suitable length is cut at each end of the poster belt to cooperate with respective switches. The center microswitch 36 is employed to break the energizing circuit for motor 23 so as to stop the movement of the poster belt when a poster is properly framed. Slots of suitable length are cut in the poster belt with the same spacing as the corresponding posters. To avoid interference between the framing slots and reversing slots, microswitch 36 may be placed slightly below microswitches 35 and 37.

Since gears 25, 25' rotate at the same speed, whereas the poster belt 19 winds up first on one drum 17, 17', and then on the other, it is necessary to provide for relative movement between at least one drum and its corresponding gear.

Also it is desirable to have the drums readily exchangeable. Referring to Fig. 11, drum 17 has secured therein the spaced plates 38, 38' within which the shaft 39 is journaled for free rotation. A flat spiral spring 40 is secured at its outer end to plates 38, 38' by pin 41, and at its inner end to the shaft 39.

At one end of shaft 39 is affixed the annular ring gear 42 having teeth on the inner surface thereof meshing with gear 43. The end of drum 17 has an opening 44 therein so that the drum can be slipped over gear 43. Thus the drum can be readily removed and replaced in driving engagement with gear 43. After inserting the drum in place, the retaining thumb screw 45 (Fig. 2), threaded in frame 16, is screwed down into a recess in the top end of the drum, the drum being freely rotatable about the end of thumb screw 45.

Gear 43 is secured to one end of shaft 46, journaled in the frame 30, 30', and driving gear 25 is also secured to the shaft 46. Thus when gear 25 is driven by motor 23 (Fig. 3), it drives shaft 39 through gears 43, 42, and the rotation is transmitted to drum 17 through spring 40. The spring allows relative movement between the drum and shaft 39 so that drum 17 can rotate at a speed somewhat different from drum 17' and thereby enables the poster belt to wind around first one and then the other of the drums.

A desired minimum tension is maintained on the poster belt by means of washers 47, each washer having a bent over lug 48 adapted to engage the lug of the washer next below. The lug of the bottom washer is adapted to engage an abutment 49 on the plate 38. The lug of the top washer is adapted to engage an abutment 50′ on collar 50 which is secured to shaft 39. The number of washers determines the number of rotations the shaft 39 can make with respect to drum 17, as will be understood, and is selected to allow the poster belt to fully roll and unroll on the drum. The drum is initially assembled so that in the fully unwound position, spring 40 is partly tensioned.

Drum 17′ is provided with a gear 42 to permit convenient removal. It is unnecessary to duplicate the spring 40 and washers 47, however, so that gear 42 can be secured directly to the drum 17′.

The use of gears 42 and 43 facilitates loading since the large number of teeth permits engagement in a number of angular positions. However square, triangular or other shapes of cooperating surfaces can be employed if desired.

Referring now to Fig. 4, the cabinet houses at one end a radio receiver 51. This receiver may be of conventional design and is preferably complete except for loud speaker, the loud speaker being housed in the display cabinet as shown in Fig. 2. The other end of cabinet 11 houses the phonograph unit. The phonograph unit may be supplied with a separate amplifier but, for economy, it is advantageous to use the audio system of the radio receiver for the phonograph also. Usually the output of the phonograph pickup will be somewhat less than that of the radio frequency stages of the radio receiver, so that an additional pre-amplifier may be employed for the phonograph pickup.

As shown in Fig. 4, a sound record 52 is fed around rollers 53 and across the gate 54 by sprocket wheel 55 driven by motor 56. The sound record is here shown as an endless film having a plurality of sound tracks 57 (Fig. 10) recorded side by side thereon. It is advantageous to have the rollers arranged so that the film does not ride on itself but is free running, as shown. The endless band is considered distinctly advantageous, but it would be possible to wind the ends of the film on rollers and reverse the direction of motion, in a manner similar to that of the poster belt. The sound tracks may be recorded on the endless band in any desired manner, the photographic process being considered preferable at the present time.

The pickup comprises a light source 58, a condenser lens system 59 adapted to focus the light into a line at the film in gate 54, and a photoelectric cell 61. This may be of conventional design and need not be described further.

In order to register the pickup successively with each of the plurality of sound tracks in synchronism with the exhibition of the corresponding posters, means are provided for moving the pickup and sound film relatively to each other in a direction lateral of the film. Either the sound record and rollers 53 or the pickup may be supported on a laterally movable carriage, but it is easier to mount the pickup on the movable carriage.

As shown in Figs. 5-7, the rollers 53 supporting the sound film are rotatably mounted on a fixed platform 62. Rods 63 are attached to the fixed platform 62 and carry the movable carriage comprising the upper and lower plates 64, 64′, held in spaced relationship by the hollow pillars 65 which slide on rods 63. The pickup light source 58, condensing lens 59 and photoelectric cell 61 are mounted on the upper plate 64 of the movable carriage. The carriage moves up and down between the fixed side plates 66, 66′, to which a horizontal plate 67 is secured. A lead screw 68 is rotatably mounted at its ends to the fixed platform 62 and the horizontal fixed plate 67. The upper plate 64 of the movable carriage is threaded at 69 to engage the lead screw. Revolving stops 71 and 71′, secured to the lead screw 68, cooperate with pin 72 on the movable carriage to limit the travel of the carriage. The lead screw is driven by drive shaft 73 through bevel gears 74. As the lead screw rotates, stops 71 and 71′ rotate and the pin 72 on the movable carriage moves up or down, as the case may be. Assuming it to be moving up revolving stop 71 will eventually just clear pin 72 and on the next revolution will be blocked by the pin so that further rotation of the lead screw will be prevented. Suitable adjustments may be provided for initially setting the clearances of the stops.

In order to register the pickup accurately with the several sound tracks, a clutch 80 is employed so designed as to effect movement of the drive shaft 73 in multiples of a selected angular movement thereof, the term "multiple" including one. In the specific embodiment here described the clutch is so designed as to rotate the drive shaft one complete revolution for each energization of the driving means, and the ratio of bevel gears 74 and the pitch of the lead screw 68 are selected so that one revolution of the drive shaft will cause the pickup to register with the next successive sound track. The control of the clutch is effected at a substantially non-rotating point, so that the position of disengagement is definitely related to the position of the pickup relative to the sound record.

The driving means for the pickup registering mechanism includes a reversible driving motor 75, advantageously of the split-phase A. C. type, whose driving pulley 76 drives the intermediate pulley 77 through a spring belt 78. Gear 79 is connected to the intermediate pulley 77, both being mounted on a common shaft, and meshes with gear 81 to which a pulley 82 is secured. Pulley 82 drives pulley 83 through another spring belt 84. Pulley 83 may be termed the driving member of this clutch 80 and is seen to be coupled to motor 75 throughout a yieldable or slippable driving connection comprising belts 78 and 84.

Driving pulley 83 is mounted to freely rotate on drive shaft 73. Affixed to the drive shaft is the driven member 85. Slidably mounted within driven member 85 is the slider 86. This slider is mounted to allow lateral movement, but not substantial rotational movement, and as here shown is movable substantially along the diameter of the driven member 85.

The driving pulley 83 has an axially projecting portion 87 extending within the slider 86. The projecting portion 87 and slider 86 are constructed so that they engage in driving relationship when the slider is moved to a suitable position. The construction here specifically illustrated provides four grooves 88 spaced at equal intervals around the periphery of the projecting portion 87, and a cooperating tongue 89 on the inner surface of the slider. Fig. 5 shows the slider and driven member in disengaged position, whereas Fig. 8 shows them in engaged position. The slider 86 is biased into engaged position by spring 91.

Slider 86 is provided with a projection 92 adapted to protrude through a suitable opening in the driven member 85. In the protruded position the slider engages the driver member 83 in driving relationship, and in the receded position the slider disengages. A slider-actuating member comprising lever 93 and roller 94 is pivoted about a fixed axis 95 so as to engage the slider at a substantially non-rotating point. It is advantageous to provide the periphery of the driven member 85 with a recess 96 adapted to receive the roller 94. The slider-actuating member 93 is biased by spring 97 to force the slider into disengaged position.

Magnet 98 with armature 99 and link 101 is coupled to the slider-actuating member 93 so that when the magnet is energized the member 93 is pulled away from the driven member 85 to allow the slider to engage the driver member 83. Fig. 8 illustrates the position of the driven member 85, slider 86 and slider-actuating member 93 at the instant of energization of the magnet 98. The slider is biased into engagement with the portion 97 of the driver pulley 83 by spring 91. Assuming that motor 75 is energized so as to turn the pulley 83, the member 85 will be rotated as illustrated in Fig. 9. If at some point during the revolution the magnet 98 is de-energized, when the recess 96 reaches the point of engagement with roller 94 at the completion of the revolution, the roller will be pressed into the recess by spring 97 so as to force the slider 86 out of engagement with the driver member 83. This position is shown in Fig. 5. Thereupon rotation of the drive shaft 73 will cease, and the pickup will be accurately registered with the next sound track.

The use of four grooves 88, rather than merely one, is advantageous so that the tongue 89 of the slider may engage a groove quickly after magnet 98 is energized. Of course, any desired number of grooves may be employed.

In normal operation, it is contemplated that motor 75 will be reversed at the ends of travel of the movable carriage. However, if the motor is not reversed at the proper time, pin 72 (Fig. 6) will engage one or the other of stops 71, 71', to prevent further movement of the carriage in the respective direction. Spring belts 78 and 84 in the coupling between motor 75 and driver member 83 permits the motor to continue to rotate without moving the carriage or breaking any part of the mechanism. It will be observed that the registration of the pickup with the sound tracks is accurately determined by the use of the step-by-step or one-turn clutch mechanism described hereinbefore, so that slipping of the motor with respect to the driver element does not affect the proper registration.

As will be subsequently pointed out, the end posters on the poster belt are moved slightly beyond the positions in which they are framed in the window of the display unit before the poster motor is reversed, and the movement is interrupted when the end posters return to their framing positions. Since it is desired to maintain the pickup registration in synchronism with the poster display unit at all times, the stops 71, 71' are advantageously adjusted to allow the pickup to move slightly beyond the last sound track at each end of travel. Then, by reversing motor 75 at the same time the poster motor 23 is reversed, the pickup will be returned to its registering position with the last sound track and movement will thereupon be interrupted by the slider-actuating member 93. The apparatus could be designed to display the end posters only once. In such case the stops of the registering mechanism could be adjusted to eliminate the slight movement beyond the last sound track.

Although the design of the step-by-step or one-turn clutch specifically illustrated is believed advantageous, the details thereof are of course subject to considerable modification.

Referring now to Fig. 13 the connections are shown between the various component parts of the apparatus whereby the phonograph pickup is moved in synchronism with the poster display unit and whereby the phonograph records are reproduced at non-consecutive appearances of the respective posters with the radio automatically rendered operable during the intervals when the phonograph is not playing. The diagram is divided into two parts, the left section being the components and connections of the radio-phonograps unit and the right section representing the components and connections of the display unit. The two units are connected by a cable 12 having ten wires therein whose ends are represented by the numerals 1—1, 2—2, etc. For convenience the cable will be provided with plugs at each end and is advantageously a sheathed cable having its sheath grounded as illustrated.

Radio tuner 102 is connected to amplifier 103 through contact 104 of switch 105 when the switch is in its upper position. In the lower position of the switch, the radio tuner is disconnected from the amplifier and the output of preamplifier 106 for the pickup photoelectric cell 61 is connected to the amplifier 103 through the lower contact 104'. The control of relay 105 is effected by timing means to be described hereinafter. It is desirable, although not absolutely necessary, to disconnect the speaker 15 from the ouput of amplifier 103 while the amplifier is being switched from the radio tuner to the phonograph, or vice versa, so as to eliminate objectionable clicks. For this purpose relays 107 and 108 are provided. As shown, the upper contacts 107' and 108' are connected together and the lower contacts 107" and 108" are connected together, the armatures being respectively connected to the output of amplifier 103 and to line 109 connected through cable wire 9 to the speaker. Thus, when both relays 107 and 108 are in the upper position, or when both are in the lower position, the speaker will be connected to the amplifier. However, when one relay is in the upper position and the other in the lower position, the speaker will be disconnected.

Power for the radio tuner, amplifier and phonograph preamplifier may be provided in the usual manner. The apparatus here specifically illustrated is intended to operate on alternating current, but it is desirable to employ direct current relays for economy and reliability. Power for the relays is obtained from the alternating current mains 111 through transformer 112 and rectifier 113. This rectifier may be of any convenient design, that shown being merely one type of circuit which has been found operable. When the apparatus is first plugged into the mains, and before the rectifier has had sufficient time to warm up to supply actuating current for the various relays, it may be that the poster belt is at the end of its travel and hence energization of the poster motor may result in tearing the poster belt. To prevent this, a relay 114 is inserted in the circuit which supplies the poster and phonograph motors, and the actuating coil is connected to the output of the rectifier through lines 115. Thus the motors cannot be energized until the rectifier 113 has warmed up sufficiently to supply actuating current to close relay 114 and to operate the other relays of the units.

For definiteness in describing the construction and operation of the apparatus, it will be assumed that there are fourteen posters and fourteen corresponding advertising talks; that each poster is to be exhibited for fifteen seconds; and that the accompanying advertising talk is to be rendered at each sixth appearance of a given poster. It will be clearly understood however that the apparatus may be designed for a different number of posters and talks, and for different timing, as desired, the particular figures here given being for purposes of clearness of description.

A timer is provided comprising a synchronous clock 116 energized from the mains and constructed to rotate shaft 117 at 4 R. P. M.. On the end of the shaft is a poster belt timing cam 118 making one contact at each revolution. Cam 118 operates switch 119 which normally closes circuit with the lower contact 119' and momentarily closes circuit with the upper contact 119" at each revolution of the cam, that is, every fifteen seconds. Shaft 117 is geared to shaft 120 through gears having a ratio of six to one, so that shaft 120 rotates one revolution each minute and a half. On the end of shaft 120 is the phonograph timing cam 121 which operates switch 122 to close circuit with contact 122' at each revolution of the cam, that is, at one and one-half minute intervals. Timer cam 118 initiates movement of the poster belt and timer cam 121 initiates movement of the sound record 52.

For convenience the control and operation of the poster unit will be described first. In the position of rest shown in Fig. 13, poster timing switch 119 is in the lower position and poster microswitch 36 registers with a poster framing slot 123 in the poster belt, thus closing the inner contact 36' of the switch and opening the outer contact 36". The inner contact 36' closes the circuit of lamp 20, thus energizing the lamp through wires 125 and 126 and cable wires 1 and 2 to the power mains.

Movement of the poster belt is initiated by energizing poster motor 23 through timing cam 118, and is stopped by deenergizing the poster motor through microswitch 36. The poster motor 23 here shown is a split-phase motor having a capacitor in the split-field winding circuit. This motor may be reversed by reversing the main field winding leads with respect to the split-field winding leads. The split-field winding leads are connected to cable wires 1 and 3 through wires 125 and 127. Cable wire 1 is directly connected to the lower side of the power line 111. Cable wire 3 is connected through wires 128, 129 and 130 to the upper contact 119" of the poster timing switch, the tongue of the switch being connected to the other side of the power line 111 through wire 131. Thus the poster motor is energized whenever the cam 118 throws the poster timing switch 119 to its upper position.

The split-field winding of the poster motor 23 may also be energized through the microswitch 36 when the switch is in its outer position making contact with 36". This circuit consists of a connection 132 between the contact 36" and wire 127 leading to the side of the split-field winding which is not directly connected to the power mains. The tongue of microswitch 36 is connected through wire 133 to cable wire 2 and thence to the upper side of the power mains, thereby completing the energizing circuit. Thus, when the poster timing cam moves switch 119 to its upper position the poster motor 23 is momentarily energized and moves the poster belt so that the roller of microswitch 36 moves out of a slot and onto the poster belt, thus moving the switch to its outer position and continuing energization of the motor through the circuit established by the outer contact 36". The motor will continue to be energized until the next framing slot 123 comes beneath the microswitch 36, whereupon the energizing circuit will be broken. By locating the slots 123 at the proper points with respect to the corresponding posters, when the microswitch falls into a slot and deenergizes the motor 23, the corresponding poster will be accurately framed in the window of the unit. The poster timer should be constructed so that the switch 119 remains in its upper position long enough to move the slot from beneath the microswitch, but the timer should break contact prior to the arrival of the next slot so that microswitch 36 will have full control of the stopping.

The brake-operating solenoid 32 is connected across the split-field windings of motor 23 so that whenever the motor is energized the brake will be taken off. Upon deenergizing of the split-field windings the solenoid 32 is deenergized, thereby releasing the brake and quickly stopping the movement.

The reversing of motor 23 is effected through microswitches 35 and 37 cooperating with corresponding slots at opposite ends of the poster display, and relay 134. One main field winding lead is connected through cable wire 4 to the outer contacts of the upper and middle tongues of relay 134, while the other main field winding lead is connected through cable wire 5 to the middle contacts. The upper tongue of relay 134 is connected through wires 135 and 136 to the lower side of the power mains. The middle tongue is connected through wire 137 and either upper contact 119" of the poster timing switch or the outer contact 36" of the poster microswitch 36 to the upper side of the power mains. Thus, the main field and split-field windings are simultaneously energized and deenergized. In the upper position of reversing relay 134 the main field winding leads are connected to the power mains 111 in one sense, and in the lower position of the relay the main field winding leads are connected to the power lines in the opposite sense. Since the split-field windings are always energized in the same sense this effects a reversal of the motor.

The actuation of reversing relay 134 is under the control of the reversing microswitches 35 and 37. When the poster belt 19 has moved from right to left to the end of its travel, the roller of microswitch 37 will fall into a suitable slot (not shown in Fig. 13) and will close contact. One lead of the actuating coil of reversing relay 134 is directly connected to the lower side of line 138 which is continuously energized by rectifier 113 through wires 115. The other lead of the actuating coil is connected through cable wire 7 to the tongue of relay 37 and, when the relay is closed, the circuit is completed through cable wire 8 to the upper side of line 138. This pulls reversing relay 134 to its lower position and establishes a holding circuit for the relay through contact 139. This holding circuit maintains the reversing relay in its lower position until the poster belt reaches the opposite end of its travel. At that point the roller of microswitch 35 falls into slot 140, thus closing the circuit with the relay contact. The tongue of relay 35 is connected through cable wire 7 to one side of the actuating coil of relay 134, and the contact of relay 35 is connected through cable wire 6, the lower side of line 138 and wire 141 to the other side of the actuating coil. Thus when relay 35 closes it short circuits the actuating coil, causes the reversing relay to return to the upper position shown in Fig. 13, and breaks the holding circuit. The reversing relay will thereafter stay in its upper position until the poster belt reaches the opposite end of its travel, whereupon the sequence will be repeated. Resistance 142 is inserted in the line between the rectifier and actuating coil so that when the actuating coil is short circuited, the resulting short circuit of line 138 will not open the safety relay 114.

Turning now to the operation of the phonograph, means are provided for moving the pickup to the next sound track at the same time the poster is changed, so that the pickup is always registered with the sound track corresponding to the poster being displayed, even though, as will be described hereinafter, the phonograph is not actually playing. To effect this, the phonograph registering motor 75 has its split-field and main field windings connected in parallel with the split-field and main field windings, respectively, of poster motor 23. Thus, whenever poster motor 23 is energized (or reversed), the phonograph registering motor 75 will simultaneously be energized (and reversed). However, it is desired that stopping of the movement of the pickup carriage 64 be independent of the stopping of the poster belt, so that the pickup registration can be controlled independently. This is effected by means of the one-turn clutch 80 and actuating magnet 98 described hereinbefore.

The actuating magnet 98 is connected to the power mains 111 through relay 143 and line 131. The actuating coil of relay 143 is normally energized by the lower contact 119' of poster timing switch 119. Relay 143 is therefore normally held in open position and magnet 98 is normally unenergized. Thus clutch 80 is normally held in disengaged position. When the poster timer 118 closes the upper contact 119" to initiate movement of the poster belt, it simultaneously deenergizes relay 143 and establishes an energizing circuit for magnet 98. This results in the momentary withdrawal of the clutch-actuating member 93 to engage the clutch and permit motor 75 (which is simultaneously energized by the poster timer contact 119") to begin turning the driven member 85 and drive shaft 73. The clutch 80 will thereupon make one full revolution to shift the pickup to the next sound track. The duration of contact of poster timer switch 119 is selected with respect to the speed of rotation of the clutch so that the magnet 98 is deenergized prior to the completion of a full revolution. Thus the clutch-actuating member 93 will stop rotation of the drive shaft by disengaging the clutch after one complete revolution.

The playing of the phonograph is initiated by phonograph timer 121 which, as before explained, rotates more slowly than the poster timer 118. When the phonograph timer closes it energizes the phonograph motor 56 through line 131 and causes the sound film 52 to be moved longitudinally relative to the pickup so as to reproduce the sound track with which the pickup is registering at the time. Movement of the sound film causes the roller of microswitch 144 to ride out of notch 145 of the sound record and on to the normal width of the record, thereby closing the contacts of the microswitch. The closing of the lower contact establishes an energizing circuit for motor 56 with line 131, thereby continuing the movement of the sound record until the notch 145 again reaches the microswitch, whereupon the microswitch will ride into the notch and open the energizing circuit for the motor. Movement of the film will therefore cease after one talk has been reproduced, and the phonograph will remain silent until the phonograph timer initiates the next longitudinal movement. Energization of the phonograph motor 56 simultaneously energizes the exciter lamp 58 of the pickup through transformer 146.

The upper contact of microswitch 144 controls the transfer of the loud speaker from radio to phonograph and vice versa. The closing of microswitch 144 establishes an energizing circuit from rectifier 113 over wires 147 to the actuating coil of relay 108, the circuit being completed through ground. The upper tongue of relay 108 thereupon makes contact with the lower contact 108" and breaks the circuit to loud speaker 15, as described hereinbefore. The making of the lower contact of relay 108 establishes an energizing circuit from rectifier 113 over wires 148 and 149 to the actuating coil of relay 105, the circuit being completed through ground. Moving of relay 105 to the lower position transfers amplifier 103 from the radio tuner to the photoelectric cell preamplifier 106. The lower tongue of relay 105 simultaneously establishes an energizing circuit for relay 107 from the rectifier through wires 148 and 150, the circuit being completed through ground. Energization of relay 107 moves the relay to the lower position and, since relay 108 is also in the lower position, the circuit to the loud speaker is reestablished to reproduce the advertising talk.

Upon completion of the talk the microswitch 144 returns to the open position illustrated in Fig. 13, thereby causing the reverse sequence of operations. Relay 108 is first deenergized and resumes its upper position, thereby breaking the circuit to the loud speaker and also breaking the energizing circuit for relay 105. Relay 105 thereupon returns to its upper position, returning the amplifier 103 to the radio tuner 102 and simultaneously breaking the energizing circuit for relay 107. The return of relay 107 to its upper position, together with the upper position of relay 108, reestablishes the circuit to the loud speaker and any selected radio program will then be reproduced.

In order to permit the radio-phonograph unit to be placed in any corner, it is advantageous to provide duplicate plugs on opposite sides of the unit. Thus duplicate aerial plugs 160, 160', connected in parallel are provided. Also, duplicate plugs 161, 161' for the cable 12 to the poster unit. Duplicate plugs 162, 162' for the power mains present a problem in that if they are connected in parallel the plugging in of one plug applies a potential to the contacts of the other plug which may give a shock to a person who accidentally brushes against the contacts. To avoid this, the arrangement of Fig. 14 is employed. Plugs 162 and 162' have their prongs connected in series. A female socket 163 connected to the power mains through wire 164 can be plugged into either 162 or 162'. An additional socket 165 is provided having its terminals short-circuited by a loop of wire inside the plug. By placing socket 163 over either of plugs 162 or 162', and by placing short-circuiting socket 165 over the other plug, the circuit is completed to energize line 111. In this manner power can be supplied to either plug 162, 162' without danger due to exposed line contacts of the other plug.

*Operation*

The operation of the apparatus will be clear, in the main, from the foregoing description. Upon plugging the apparatus into the mains 111, the rectifier 113 warms up and closes relay 114, thereby placing the apparatus in full operating condition. The poster timer 118 initiates movement of the poster belt at desired intervals and the movement of the poster belt is stopped in position to properly frame successive posters under the control of microswitch 36 and slots 123 associated with the displays. At each end of travel of the poster belt the corresponding reversing microswitch 35 or 37 operates through reversing relay 134 to reverse the connections of the rotor of poster motor 23 to cause the poster belt to travel thereafter in the opposite direction. The reversing slots 140 in the poster belt are preferably positioned so that the poster belt travels slightly beyond the last framing position before reversing, so that the end posters are displayed twice in succession.

The phonograph registering mechanism is operated in unison with the poster display mechanism, motor 75 being energized simultaneously with poster motor 23, and also reversed simultaneously therewith. The clutch mechanism 80 is controlled by the poster timer 118 through relay 143 and magnet 98, so that the phonograph pickup moves to the next sound track as the poster belt moves to the next display. However, the stopping of movement of the pickup is controlled independently of that for the poster unit so that proper framing of the poster displays and proper registration of the pickup with the sound tracks are controlled by the position of the poster belt and pickup, respectively.

Since relays and switches are employed in controlling the operation of the poster unit and pickup registering mechanism, occasionally a switch or relay may fail to operate perfectly and thus cause the pickup and poster units to get out of synchronism. The provision of stops at the ends of travel of the pickup carriage and yieldable or slippable connections to the motor 75 reestablishes correct synchronism, although one or two false talks may be given in the meantime. For example, assume that while the pickup carriage is traveling upwards it gets behind the poster unit by one or more sound tracks, so that when the poster and registering motors are simultaneously reversed the pickup will not yet have reached its top sound track. During the following downward movement of the pickup it will be out of synchronism with the poster unit, but only one or two talks will be reproduced during this downward movement. The pickup carriage will reach the bottom of its travel before the poster unit reaches the end of its travel. The lower stop will prevent the carriage from moving further and the slippable driving connection will permit the motor 75 to turn simultaneously with the poster motor until the poster unit reaches the end of its travel. At that time the pickup and poster units will again be in correct synchronism and the reversal of both motors will cause the pickup carriage to begin its upward travel simultaneously with the reversal of the poster belt.

If, on the other hand, during an upward movement of the pickup carriage it should get ahead of the poster unit, the stop at the top will prevent the carriage from moving until the poster belt has reached the end of its travel and both units are reversed.

This resynchronizing feature will therefore be seen to be highly advantageous in maintaining fairly satisfactory operation even though one or more components are not operating quite satisfactorily, until a service man can readjust the defective element. Although it is preferred to employ the stops on the pickup registering unit and control the reversal by the position of the poster unit, it would be possible to employ the stops on the poster unit and control reversal by the pickup registration unit.

At selected intervals the phonograph timer 121 causes the phonograph to reproduce the talk with which the pickup is then registering, and which corresponds to the poster then being displayed. In the specific embodiment here described the phonograph plays during the exhibition of every sixth poster. The selection of fourteen posters and fourteen sound tracks, together with the exhibition of the end posters twice in succession, results in each poster having its corresponding talk reproduced during a complete cycle of operation before any poster has its talk given twice.

It will be understood that the ratio between phonograph and poster timers may be changed as desired, and the number of posters and talks selected to correspond with the ratio chosen. In fact, by placing six pins uniformly spaced around the periphery of phonograph timer 121, the phonograph may be caused to reproduce an advertising talk at each appearance of each display. For such a modification, the radio will of course not be rendered operable. This is not the preferred operation but illustrates the flexibility of the system. The pickup registering mechanism and resynchronizing features will of course be important even in such a modification.

During intervals that the phonograph is not playing, the microswitch 144 automatically renders the radio operable and any desired programs can be tuned in. The interspersal of the advertising talks with a considerable amount of entertainment material from the radio is effective in maintaining interest and securing the attention of the public to the advertising talks without their becoming monotonous.

Instead of employing a radio, it is also possible to employ an automatic phonograph. The output of such an automatic phonograph would be attached to relay 104 so that the playing of the automatic phonograph is interrupted at desired intervals and the advertising talks reproduced. It would also be feasible to provide both a radio and automatic phonograph, with a switch for connecting them alternatively to relay 104, thus permitting the store owner to choose either a radio program or a selection of recordings. It will be understood that the automatic phonograph and the records used therein may be of the usual type, since the advertising talks and the interspersal thereof is taken care of by the phonograph unit 11.

Although the apparatus described herein is designed for operation on A. C. mains, it would, of course, be possible to modify it for D. C. or A. C.—D. C. operation.

It will be appreciated that the specific embodiment described hereinbefore is given for purposes of illustration only, and that many of the details of the apparatus may be changed in accordance with the ideas of the designer. Therefore, the present invention is not limited to the mere details of design, construction and arrangement of the elements disclosed, since many modifications may be made by those skilled in the art without departing from the spirit and scope of the invention.

We claim:

1. In display apparatus, the combination which comprises a plurality of displays, a display moving unit, a phonograph having a sound record with a plurality of sound tracks side-by-side thereon corresponding to said displays, a pickup adapted to cooperate selectively with each of said sound tracks, a pickup registering unit for relatively moving the pickup and sound record laterally of the record, means for intermittently energizing said display moving unit and said pickup registering unit to successively exhibit said displays and to register the pickup with the sound track corresponding to the display being exhibited, means responsive to the position of one of the said units for reversing the direction of movement of the other unit, and a stop at one end of travel of said other unit for preventing further movement and thereby restoring synchronism in the event said other unit reaches the end of travel before reversal by said one position.

2. In display apparatus, the combination which comprises a plurality of displays, a display moving unit, a phonograph having a sound record with a plurality of sound tracks side-by-side thereon corresponding to said displays, a pickup adapted to cooperate selectively with each of said sound tracks, a pickup registering unit for relatively moving the pickup and sound record laterally of the record, means for intermittently energizing said display moving unit and said pickup registering unit to successively exhibit said displays and to register the pickup with the sound track corresponding to the display being exhibited, means responsive to the position of one of the said units for simultaneously reversing the direction of movement of both said units, and a stop at each end of travel of the other of said units for preventing further movement and thereby restoring synchronism in the event said other unit reaches an end of travel before reversal by said one position.

3. In display apparatus, the combination which comprises a plurality of displays, a display moving unit, a phonograph having a sound record with a plurality of sound tracks side-by-side thereon corresponding to said displays, a pickup adapted to cooperate selectively with each of said sound tracks, a pickup registering unit for relatively moving the pickup and sound record laterally of the record, timing means for periodically initiating energization of the display moving unit and pickup registering unit, means independently responsive to the display and pickup registration positions for stopping the displays in position for successive exhibiting and the pickup in registration with the corresponding sound tracks, means responsive to the position of one of the said units for simultaneously reversing the direction of movement of both said units, a slippable driving connection in the other of said units, and a stop at each end of travel of the other of said units for preventing further movement and thereby restoring synchronism in the event said other unit reaches an end of travel before reversal by said one position.

4. In display apparatus, the combination which comprises a display unit having a plurality of displays, a display moving unit, a phonograph unit having a sound record with a plurality of sound tracks side-by-side thereon, a pickup adapted to cooperate selectively with each of said sound tracks, a phonograph pickup registering unit, reversible driving means for moving said displays successively into exhibiting position and for relatively moving said pickup and sound record laterally of the record to register the pickup successively with the sound track corresponding to the display being exhibited, timing means for initiating movement by said driving means, means for independently stopping movement of said displays and of said pickup and sound record relative to each other, a stop at one end of travel of one of the said units, a yieldable driving connection between the driving means and said one unit, means for reversing said driving means, said yieldable driving connection cooperating with said stop to restore synchronism in the event said one unit reaches the end of travel before the other unit.

5. In display apparatus, the combination which comprises a poster-belt having a plurality of posters spaced therealong, a phonograph having an endless sound record with a plurality of sound tracks side-by-side thereon corresponding to the posters, a pickup adapted to cooperate selectively with each of said sound tracks, driving means for moving said poster-belt intermittently to exhibit the posters successively and for relatively moving the pickup and sound record laterally to register the pickup with the corresponding sound tracks, a slippable driving connection in the driving means for relatively moving pickup and sound record, means for reversing said driving means at the ends of travel of the poster-belt to reverse the movement of the poster-belt and the pickup relative to sound record, and a stop at each end of travel of the pickup relative to sound record, said slippable driving connection and said stops cooperating to restore synchronism in the event that an end of travel of the pickup relative to sound record is reached before the driving means is reversed.

6. In display apparatus, the combination which comprises a poster-belt having a plurality of posters spaced therealong, means including a reversible poster motor for moving said poster-belt, a phonograph having an endless sound record with a plurality of sound tracks side-by-side thereon corresponding to the posters, a pickup adapted to cooperate selectively with each of said sound tracks, means including a selector motor and a yieldable driving connection for relatively moving said pickup and sound record laterally of the record to register the pickup successively with said tracks, means for intermittently energizing said poster and selector motors to change the poster being exhibited and to register the pickup with the corresponding sound track, means for simultaneously reversing poster and selector motors at opposite ends of the selected travel of the poster-belt, and a stop at each end of travel of the pickup relative to sound record, said yieldable driving connection cooperating with said stops to restore synchronism in the event that the pickup registration gets out of step with the poster-belt by preventing change at the ends of travel of the pickup relative to sound record until the poster and selector motors are reversed.

7. In display apparatus, the combination which comprises a poster-belt having a plurality of posters spaced therealong, means including a reversible poster motor for moving said poster-belt, a phonograph having an endless sound record with a plurality of sound tracks side-by-side thereon corresponding to the posters, a pickup adapted to cooperate selectively with each of said sound tracks, means for relatively moving said pickup and sound record longitudinally to reproduce a sound track, means including a selector motor and a slippable driving connection for relatively moving said pickup and sound record laterally to register the pickup successively with the sound tracks, timing means for periodically initiating movement by said poster and selector motors, means independently responsive to the poster-belt and pickup registration positions, respectively, for stopping the poster-belt to exhibit the posters successively and to register the pickup with the corresponding sound tracks, means responsive to the position of the poster-belt for simultaneously reversing poster and selector motors at opposite ends of the selected travel of the poster-belt, and a stop at each end of the lateral travel of the pickup relative to sound record, said slippable driving connection and said stops cooperating to restore synchronism in the event that an end of travel of pickup relative to sound record is reached before the poster and selector motors are reversed.

8. In display apparatus, the combination which comprises a display moving unit adapted to exhibit a plurality of displays successively, a sound record having a plurality of sound tracks side-by-side thereon corresponding to said displays, a pickup adapted to cooperate selectively with said sound tracks, a carriage unit movable to produce lateral movement of the pickup relative to the sound record, a drive shaft for moving said carriage, a selector motor, a clutch comprising a driver member coupled to the motor and a driven member secured to said shaft, an engaging element mounted on said driven member for lateral but not substantial rotational movement relative thereto and adapted to engage said driver member in driving relationship, an actuating member positioned for control engagement with said engaging element at a point non-rotating relative to the clutch and biased to force the engaging element to disengaged position, means for intermittently energizing said display moving unit and said selector motor, means coordinated with the said means for simultaneously intermittently actuating said actuating member to engage said clutch to rotate said drive shaft in multiples of a selected angular movement and thereby register the pickup with the sound track corresponding to the display being exhibited, means responsive to the position of one of the said units for reversing the direction of movement of the other unit, and a stop at one end of travel of said other unit for preventing further movement and thereby restoring synchronism in the event said other unit reaches the end of travel before reversal by said one position.

9. In display apparatus, the combination which comprises a poster-belt having a plurality of posters spaced therealong, a phonograph having an endless sound record with a plurality of sound tracks side-by-side thereon corresponding to the posters, a pickup adapted to cooperate selectively with each of said sound tracks, a carriage movable to produce lateral movement of the pickup relative to the sound record, a selector motor coupled through a clutch and a slippable driving connection to a drive shaft for moving said carriage, said clutch comprising a driver member coupled to the motor and a driven member secured to said shaft, a slider slidably associated with said driven member and restrained from substantial rotation relative thereto, said slider and driver member being constructed and adapted to engage in driving relationship and the slider being biased into engaged position, a slider-actuating member positioned for control engagement with said slider at a point substantially non-rotating relative to the clutch and biased to force the slider at said point to disengaged position, means for moving said poster-belt intermittently to exhibit the posters successively and for simultaneously energizing said selector motor, means coordinated with the said means for simultaneously intermittently actuating said slider-actuating member to engage said clutch to rotate said drive shaft in multiples of a selected angular movement to thereby register the pickup with the sound track corresponding to the poster being exhibited, means for reversing the poster-belt at the ends of travel thereof and simultaneously reversing the carriage, and a stop at each end of travel of said carriage, said slippable driving connection and said stops cooperating to restore synchronism in the event that the carriage reaches an end of travel before reversal.

10. In display apparatus, the combination which comprises a poster-belt having a plurality of posters spaced therealong, a reversible poster motor coupled to move said poster-belt, a phonograph having an endless sound record with a plurality of sound tracks side-by-side thereon corresponding to said posters, a pickup adapted to cooperate selectively with said sound tracks, a phonograph motor coupled to move the sound record longitudinally relative to the pickup to derive signals, a carriage movable to produce lateral movement of the pickup relative to the sound record, a selector motor coupled through a clutch and a slippable driving connection to a drive shaft for moving said carriage, said clutch comprising a driver member coupled to the selector motor and a driven member secured to said shaft, a slider mounted on said driven member for substantially diametral movement thereto, said slider having a projection adapted to protrude from the driven member and being biased into protruded position, said slider and said driver member having cooperating elements adapted to engage in driving relationship in said protruded position and to disengage in receded position, a slider-actuating member positioned at a substantially non-rotating point and adapted to engage the projection of said slider when the projection is at said point, said slider-actuating member being biased to force the slider into receded position, a timer for periodically initiating energization of the poster motor to exhibit the posters successively and of the selector motor, said timer simultaneously actuating said slider-actuating member to engage said clutch to rotate the drive shaft in multiples of a revolution to thereby register the pickup with the sound track corresponding to the poster being exhibited, means for reversing the poster motor at the ends of travel of the poster-belt and simultaneously reversing the selector motor, a stop at each end of travel of the carriage, an independent source of program material, and a timer correlated with the said timer for periodically energizing said phonograph motor to reproduce sound tracks at non-consecutive appearances of the corresponding posters and to render said independent source of program material operable in the intervals between reproductions of the sound tracks.

ARTHUR CARPENTER.
HENRY RALPH COOK, Jr.